United States Patent [19]

Inoue et al.

[11] Patent Number: 5,785,903
[45] Date of Patent: Jul. 28, 1998

[54] METHOD OF MOLDING HIGH-VISCOSITY MATERIALS

[75] Inventors: Takao Inoue, Hirakata; Junji Ikeda, Ikoma; Kazuhiro Mori, Katano, all of Japan

[73] Assignee: Matsushita Electric Industrial Co., Ltd., Osaka, Japan

[21] Appl. No.: 584,203

[22] Filed: Jan. 11, 1996

[30] Foreign Application Priority Data

Jan. 10, 1995 [JP] Japan ................... 7-001702

[51] Int. Cl.⁶ ................................................. B29C 33/38
[52] U.S. Cl. .................... 264/2.5; 264/1.1; 264/219; 264/297.1; 264/337; 264/338; 249/134; 419/66; 164/6; 164/520
[58] Field of Search .................. 264/1.1, 219, 297.1, 264/2.5, 338, 337; 249/134; 419/66; 164/6, 520

[56] References Cited

U.S. PATENT DOCUMENTS

| | | | |
|---|---|---|---|
| 5,091,025 | 2/1992 | Murakami et al. | 156/89 |
| 5,431,869 | 7/1995 | Kumar | 264/338 |

FOREIGN PATENT DOCUMENTS 4-21508  5/1990  Japan.

*Primary Examiner*—James Derrington
*Attorney, Agent, or Firm*—Wenderoth, Lind & Ponack

[57] ABSTRACT

This invention provides a method of molding which can feed the high-viscosity material quickly and accurately as well as with good operability. For achieving quick heating and cooling cycles in a mold, the mold is constructed from a mold material having superior heat-conductivity in such a way that the high-viscosity material can be heated and cooled from outside of the mold.

Thereby, this invention comprises:

- a step for preparing a mold fabricated with high orientation graphite material,
- a step for feeding high-viscosity material into the recess portion for molding inside said mold in the non-molten state,
- a step for heating and melting the high-viscosity material in the recess portion via said mold from the outside, and
- a step for cooling the molten high-viscosity material via said mold and molding it into a desired shape.

10 Claims, 9 Drawing Sheets

METHOD OF MOLDING HIGH-VISCOSITY MATERIALS

BACKGROUND OF THE INVENTION

This invention relates to a method for molding high-viscosity materials.

For a specific example of a technique to use high-viscosity material by molding, a technique for preparing a bump electrode for semiconductor ICs is known. The metallic material to be molded into a bump electrode is brought to a high-viscosity mixture liquid state together with a binder, and the mixture is discharged in a specified amount from a nozzle, and an electrode of a specified profile is molded on a substrate. This method provides features of simpler operation and reduced processes as compared to the technique for preparing bump electrodes using photolithographic or etching techniques which have been generally practiced hitherto.

On the other hand, a process for applying high-viscosity adhesive on to the substrate in a form of spots for the purpose of mold bonding, etc. is practiced. In this case, using the similar nozzle as described above, a high-viscosity adhesive is formed into a specified spot.

In the fabrication technique for the bump electrode as specified above, the molding profile of the high-viscosity material is extremely important. Moldings with a specified profile and uniform size must be produced.

However, the material liquid with high viscosity provides poor fluidity and it is difficult to accurately control the discharge rate from the nozzle. Consequently, variations tend to occur in the profile and size of the molded high-viscosity material. In the case of the above-mentioned bump electrode, there is a case in which as many as tens of to more than one hundred pieces of bump electrodes are prepared on one IC substrate, and it is extremely troublesome to change places for each of many bump electrodes and discharge high-viscosity material liquid from the nozzle to form bump electrodes one by one. In particular, the high-viscosity material liquid with poor fluidity does not begin discharging immediately even when the gate is opened or pressure is applied to discharge the liquid from the nozzle, and conversely, when discharging the liquid from the nozzle is planned to be ended, discharge is unable to be immediately stopped. Consequently, long molding time is required for one operation cycle, and operability becomes extremely degraded when a large number of moldings are repeatedly produced as described above. Improvement in the nozzle profile and construction has been proposed as a technique for solving the above problems, but satisfactory solution has not yet been obtained, leaving a problem of increased complication in the equipment construction such as nozzles, etc.

SUMMARY OF THE INVENTION

It is an object of this invention to provide a molding process which can quickly and accurately feed the high-viscosity material as described above to a recess portion for molding and can produce moldings with accurate profile and size at the accurate position with good operability when said high-viscosity material is molded into a specified profile. In order to achieve the above-mentioned object, taking a bump molding machine as an example, the bump material must be fed in a non-molten state free of high viscosity, but for this purpose, the heating and cooling cycles in which the high-viscosity material in the non-molten state is heated and melted in the recess portion for molding and, then, cooled must quickly take place.

Therefore, this invention has been completed with eyes placed on the fact that the mold itself must provide excellent thermal conductivity and must be constructed to enable heating and cooling of the recess portion for molding via mold material from outside of the mold in order to achieve the quick heating and cooling cycle inside the mold, and this invention method of molding a high-viscosity material having a high melt viscosity, which comprises the steps of:

preparing a mold fabricated with high-orientation graphite materials;

feeding the high-viscosity material into a molding recess portion of said mold in a non-molten state, heating the high-viscosity material existing in said recess portion via said mold from outside to melt said high-viscosity material; and cooling the molten high-viscosity material in said recess portion via said mold from outside to mold said molten high-viscosity material into a desired shape.

In this invention, in order to implement the above molding process, said mold must quickly and accurately transfer heat from the outside of the mold to the recess portion for molding, the high-orientation graphite material composing said mold shall be a laminate with the high-orientation graphite sheets stacked, the recess portion for molding shall be molded on one side of said laminates sheets whose end faces are arranged in a line, and the graphite crystal should be oriented to the opposite side.

In addition, in order to uniformly heat and cool the recess portion for molding of said mold, to the side opposite to the other side on which the end faces of the first graphite sheet laminate with high orientation composing said mold are arranged in a line, it is preferable to join a laminate in which the second graphite sheets are stacked in such a manner that the orientations intersect orthogonally, and to heat and cool the recess portion for molding molded on the end face from said second laminate via the first laminate.

The laminate of said sheet can be fabricated by using the process described in Japanese Non-examined Patent Publication No. Hei 4-21508, laminating specific polymer film, and eventually heat-treating at temperatures higher than 2400° C., while heat-treatment at the temperature range of 2000° C. or higher is being carried out in inert gas, but it is preferable to integrally fix the laminates by bundling them with heat-resistant band.

The said polymer film contains a filler, and is chosen from a group comprising polyoxadiazole 200 μm or thinner, polybenzothiazole, polybenzobisthiazole, polybenzoxazole, polybenzobisoxazole, poly(pyromellitoimide), poly(m-phenylene isophthalamide), poly(phenylene beozobisimidazole), polythiazole, and polyparaphenylene vinylene, but in particular, aromatic polyimide film such as poly pyromellitoimide is preferable.

For feeding high-viscosity material to the recess portion for molding in said mold, it is preferable to provide a high-viscosity material feeding means for feeding high-viscosity material to said recess portion for molding to said mold. In order to heat and melt the high-viscosity material in the recess portion for molding from outside via said mold and to cool the molten high-viscosity material, it is preferable to provide a heating and cooling means for heating and cooling selectively the inside of the recess portion for molding to the outer surface of the recess portion for molding for the mold.

When molding is carried out using the material in the powder form, it is preferable to prepare the high-viscosity material which is mixed with the binder for printing in a paste form, and metallic powder, bump material powder, dielectric material powder, insulation material powder, optical parts material powder, and other various powders are selected in accord with applications for molding. The binder for printing vaporizes and disappears during heating at the recess portion for molding. The means for feeding this paste-form high-viscosity material is preferably constructed with a screen printing plate with a powder passage located at the position corresponding to said recess portion for molding arranged at the upper part of the surface with the recess portion for molding of said mold and a screen printing machine with a squeegee which pushes to move said powder fed to the top surface of the screen printing plate along the screen printing plate.

When said high-viscosity material is a wires for wire bonding, etc., the means for feeding high-viscosity material shall be located at the upper part of the surface with the recess portion for molding of the mold and shall be constructed as a wires feeder for feeding the top end of the wires to the recess portion for molding.

On the other hand, for the heating and cooling means, it is preferable to have a heating body and a cooling body free to selectively come in contact with the opposite surface of the mold.

Because the process according to this invention comprises a mold for high-viscosity material made from high-orientation graphite and achieves excellent thermal conductivity, heating of the high-viscosity material quickly and efficiently takes place via the mold when the high-viscosity material is fed to the recess portion for molding and heated to melt. In the event of cooling the product of the high-viscosity material heated, melted, and molded, it can be quickly and efficiently cooled via the mold. Consequently, it is possible to feed powders or wires to the recess portion for molding, and to produce a specified molding using the quick heating and cooling cycle. Because this high-orientation graphite also provides excellent heat resistance, it can be smoothly applied to high-viscosity material which must be melted at high temperature.

If the high-orientation graphite is oriented from the surface with the recess portion for molding to the opposite surface, since high-orientation graphite provides particularly large thermal conductivity in the direction along the orientation, the powder or molding in the recess portion for molding on the surface can be quickly and efficiently heated and cooled by heating or cooling from the external surface opposite to the recess portion for molding inside the mold.

The high-orientation graphite is generally manufactured in a thin sheet state. If these high-orientation graphite sheets are laminated to form a laminate, a mold with sufficient thickness can be easily constructed. The laminate of high-orientation graphite oriented in the plane direction achieves the condition in which it is successfully oriented in the plane direction of the sheet as a whole. If the recess portion for molding is molded on the surface in which sheet end faces are arranged in line, a mold with extremely good orientation with high-orientation graphite orientation aligned uniformly from the surface equipped with the recess portion for molding to the opposite surface is achieved, and the thermal conductivity from the surface to the opposite surface is improved.

If the laminates of the high-orientation graphite sheets are integrally fixed by bundling with a heat-resistant band, a mold can be easily fabricated without bonding the sheets composing the laminates. Because the mold is heated to high temperature or rapidly heated and cooled repeatedly, the integrity of sheets may be degraded by such means as bonding, but bundling with a heat-resistant band can satisfactorily stand heating to high temperature or rapid heating or cooling.

Providing both means for feeding high-viscosity material and means for heating and cooling to the mold enables quick execution of a series of operating processes from feeding of high-viscosity material to the recess portion for molding, heating and melting as well as molding of high-viscosity material, and to cooling.

When the molding material is powder, if the high-viscosity material is prepared by mixing the powder and a printing binder which vaporizes by heating, easy handling as well as easy heating, melting, and molding can be achieved. In this event, if the means for feeding high-viscosity material is equipped with a screen printing machine with a screen printing plate and squeegee, a required volume of powder can be reliably and efficiently fed to the recess portion of the mold. Even when a large number of recess portions for molding are provided in the mold, it is possible to uniformly feed the powder to a large number of recess portions for molding simultaneously.

If the high-viscosity material is in the form of wires which can be heated and melted, it is hard to scatter and easy to be stored and transported. In this event, if the means for feeding high-viscosity material feeds the top end of the wire pieces to the recess portion for molding, it is possible to heat and melt and form only the required volume of wire piece in the recess portion for molding. There is no fear of high-viscosity material leaking outside the recess portion for molding. The construction of the equipment for feeding wire pieces can be simplified.

If the means for heating and cooling is equipped with a heating element and cooling element which selectively come in contact on the opposite surface of the mold, it is not necessary to equip a complicated heating mechanism or cooling mechanism inside the mold composed of high-orientation graphite, and it is easy to produce moldings. Bringing the heating element in contact with the mold quickly begins heating and separating the heating element from the mold and bringing the cooling element in contact quickly begins cooling, enabling quick change-over from heating to cooling and vice versa and improving the operation efficiency.

Because the process for molding high-viscosity material according to this invention feeds high-viscosity material in the form of powder, powder mixed paste, or non-molten condition of wire pieces to the recess portion for molding, material can be fed to the mold far simply as compared to the case in which molten high-viscosity material is fed. It is also possible to accurately set the feed rate of the high-viscosity material. If the heating element is brought in contact with the recess portion for molding of the mold at the opposite surface, the powder fed to the recess portion for molding on the surface can be rapidly heated and melted via the mold composed with high-orientation graphite with excellent thermal conductivity and molded in accordance with the profile of the recess portion for molding. If the cooling element is brought into contact with the mold in place of the heating element, moldings in the recess portion for molding are rapidly cooled and the condition that can maintain a specified molding profile is achieved. The cooled moldings can be taken out from the mold and freely used.

If the high-viscosity material is a powder mixture of metal and a binder, compacts for producing metal sintered products and compacts to be used for bump electrodes can be simply and efficiently manufactured. If the high-viscosity material is bump material, fabrication of bump electrodes can be easily and efficiently carried out. If the high-viscosity material is dielectric material or insulating material, fabrication of dielectric members and insulating members which are utilized for various electronic equipment can be easily and efficiently carried out. If the high-viscosity material is optical parts material, fabrication of optical parts utilized for various optical equipment can be easily and efficiently carried out. If the high-viscosity material is wire pieces for wire bonding, fabrication of wire bonding construction utilized for various electronic equipment can be simply and efficiently carried out.

BRIEF DESCRIPTION OF THE DRAWINGS

The above and other objects, features and advantages of this invention will be apparent from the following detailed description of the preferred embodiments of the invention in conjunction with the accompanying drawings, in which.

DETAILED DESCRIPTION OF THE PREFERRED EMBODIMENT

Figure 1:
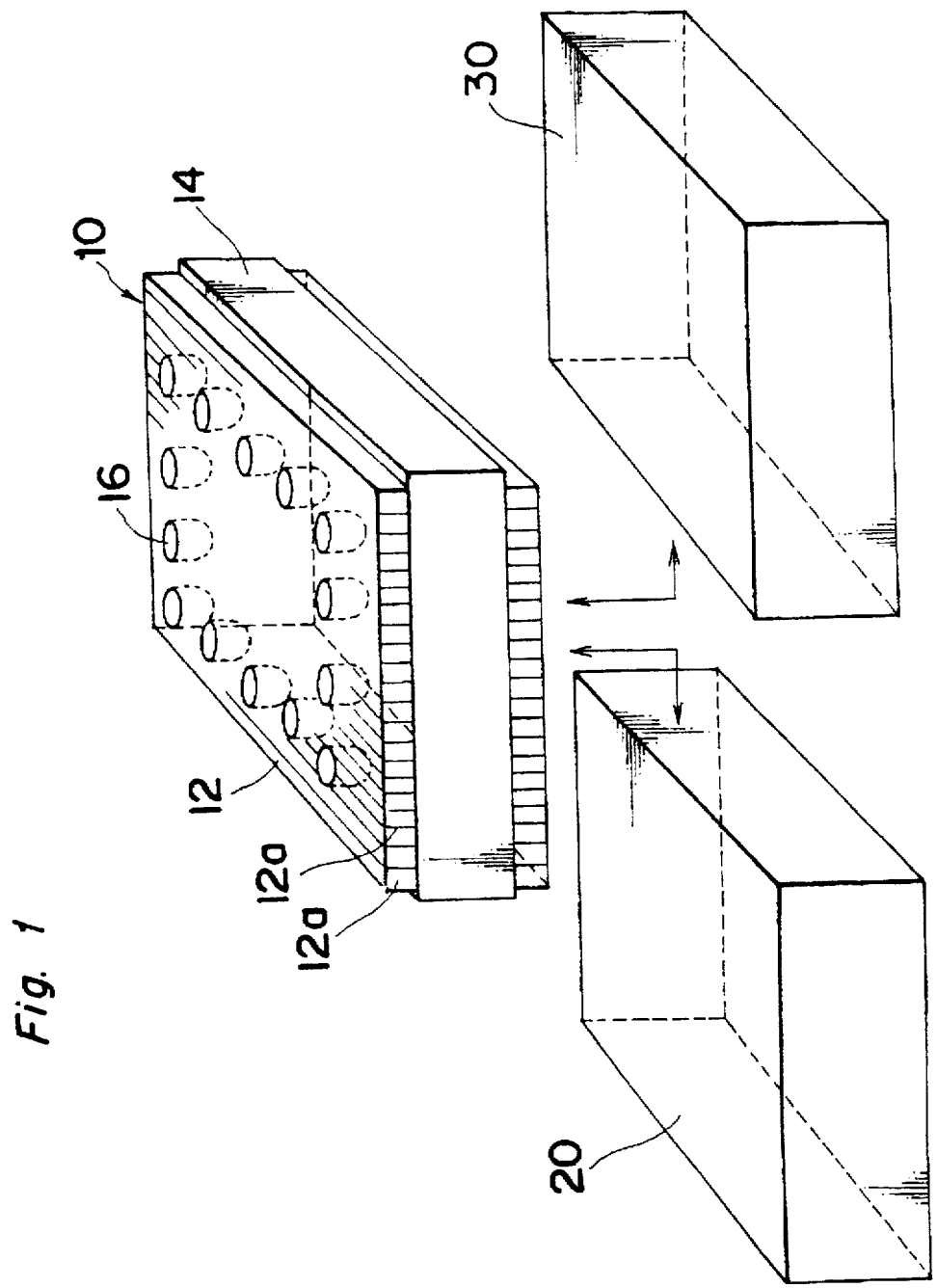
FIG. 1 is a perspective view of a molding device showing one embodiment according to this invention.

Referring now to the drawings, the present invention will be described in detail hereinafter.

The molding machine shown in FIG. 1 is a molding machine used for fabricating bump electrodes on the IC substrate. It is equipped with a mold 10, heating element 21, and cooling element 30.

The mold 10 comprises a rectangular laminate piece 12 to which strip-form high-orientation graphite sheets 12a are stacked in many pieces in the through-thickness direction and a heat-resistant band 14 arranged on the outer circumference of the laminate piece 12 along the laminate direction of the sheet 12a.

Graphite is carbon crystalline, whose crystal forms a layer structure. It is the high orientation graphite in which this carbon crystalline is arranged in a specified orientation. To manufacture high-orientation graphite, for example, specific polymer film as described above can be obtained by being fired under the following conditions. Firing polymer film with a plurality of the film stacked can produce sheet-form or block-form high-orientation graphite. For the high-orientation graphite sheet 12a, the high-orientation graphite film itself comprising polymer film as above may be used or a plurality of thin high-orientation graphite films which are stacked and fired to produce a sheet with a specified thickness may be used. The sheet 12a about 5–200 μm thick is used.

Manufacturing Example 1

Poly pyromellitoimide (available from Du Pont as CAPTON H FILM) 25 μm thick were stacked in 200 pieces and set to a graphite jig and heated to 1400° C. at a rate of 10° C./min in argon gas. During this period, to the specimen, pressure of 100 g/cm² jig weight was designed to be applied. Then, after 1400° C. was reached, the specimen was heated to 1600° C. with 30 kg/cm² pressure applied while keeping the same heating rate. Thereafter, pressure was reduced to enable only the jig pressure to be applied, and the specimen was heated to 2700° C. Then, pressure was increased to 300 kg/cm² and temperature was heated to 3000° C. to complete heat treatment, and graphite block was obtained.

Manufacturing Example 2

Poly pyromellitoimide (available from Du Pont as CAPTON H FILM) 25 μm thick containing 5% by weight of calcium hydrogenphosphate was heated to 1000° C. at a rate of 3° C./min in nitrogen gas using an LTF-S type electric furnace of Sankyo Denro Company and held for 1 hour at 1000° C. for pre-heat treatment. Then, the obtained carbonized sheet was set inside a graphite cylinder so that the sheet could be freely stretched or shrunk, and was heated to 2800° C. at a rate of 5° C./min together with the graphite cylinder using an ultra-high temperature furnace 46-5 type of Shinsei Denro Company. Heating was carried out at normal pressure in argon atmosphere. The obtained sheet was passed between two stainless rollers (available from Kumagaya Riken Kogyo) to undergo rolling treatment. A sheet with 630 kgf/cm² tensile strength and 860 kcal/m·h·°C. thermal conductivity was obtained.

The heat-resistant band 14 was made of high-orientation graphite sheet same as that of laminate 12, and was wrapped around the outer circumference of the laminate 12 to firmly bind sheets 12a composing the laminate 12, integrate, and fix. Edges of the heat-resistant band 14 are stacked and affixed or mechanically bonded.

On the top surface of the mold 10 on which end faces of sheets 12a are aligned, a plurality of recess portions 16 for molding are provided along the outer circumference. Electric discharge machining is used for providing the recess portion for molding 16 on the surface of the mold 10 comprising high-orientation graphite sheets 12a.

The recess portion for molding 16 is a flat round column with a spherical bottom. The profile and arrangement of the recess portion for molding 16 are set in conformity to the profile and arrangement of the bump electrode to be fabricated.

The heating element 20 comprises metal and others with large heat capacity, has an upper surface profile in contact with the bottom surface of the mold 10, and forms a rectangular shape as a whole. The cooling element 30 is composed with the material same as that of heating element 20 and also has a same shape.

The heating element 20 is mounted movably between the position in contact with the bottom surface of the mold 10 and a heating device (not illustrated) such as a heating furnace or a heater for heating the heating element 20 at the position away from the mold 10. The cooling element 30 is mounted movably between the position in contact with the bottom surface of the mold 10 and the position away from the mold 10. To the cooling element 30, no special cooling device is equipped but it should be kept low with respect to the heating element 20 by allowing the cooling element to cool at room temperature.

Figure 8:
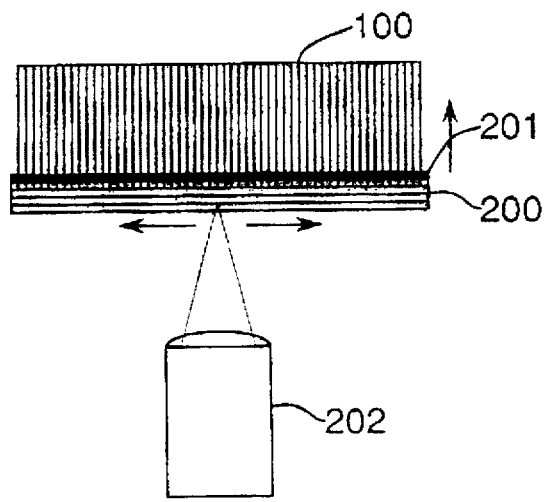
FIG. 8 is a side elevation view showing the outline of the mold when laser beam is used for heating sources.
Figure 9:
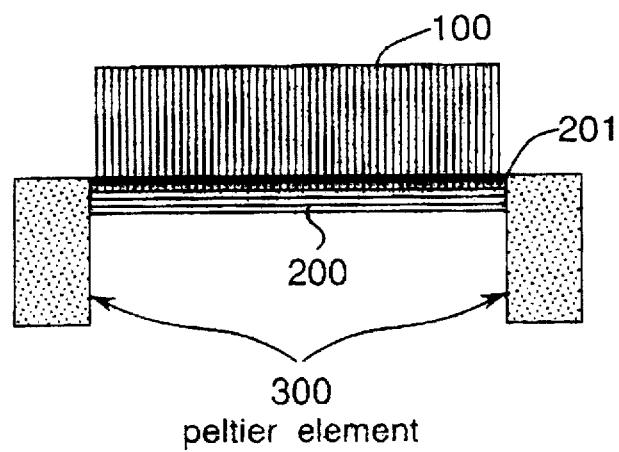
FIG. 9 is a side elevation view showing the outline of the mold when the Peltier element is used for heating and cooling sources.

In order to enable the heating element 20 and the cooling element 30 to uniformly heat and easily cool, respectively, a heating element 200 or heating and cooling element 300 with high orientation in the plane direction shown in FIG. 8 or FIG. 9 may be used on the heating and cooling sides of the mold 10.

In the case of FIG. 8, the heating element comprises bonding the laminate 200 via bonding graphite sheet 201 (which can be fabricated by the process disclosed in Japanese Non-examined Patent Publication No. Hei 2-103478 corresponding to U.S. Pat. No. 5,091,025), which comprises the second graphite sheets stacked with the orientation intersecting orthogonally on the side opposite to the other side, wherein the end faces of the mold 100, the first graphite sheet laminate of high orientation which forms the recess portion for molding 16 are arranged in parallel, irradiating the second laminate 200 with laser beam from YAG or $CO_2$ laser beam device 202 which reciprocates horizontally, receiving heat that spreads in the plane direction of the second laminate 200 via the first laminate 100, and heating the recess portion for molding 16 formed on its end face. Because the second laminate 200 has high orientation in the plane direction, the second laminate 200 provides a property to function as a uniform heating source when there is 1 mm or more thickness even when the laser beam irradiates the center.

On the other hand, in FIG. 9, in place of the laser beam device used in FIG. 8, a Peltier element 300 is used for a heating and cooling element, and the Peltier element 300 may be used as a uniform heating and cooling source for the first laminate 100 using the high orientation of the second laminate 200 in the plane direction by mounting the Peltier element 300 to part of both ends of the second laminate 200.

Now, the description will be made on the molding method using the molding machine of the above-mentioned construction.

Figure 2:
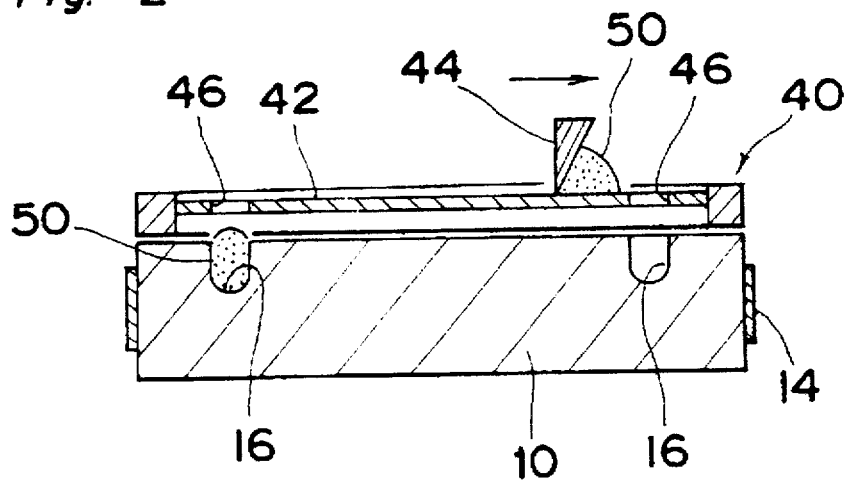
FIG. 2 is a sectional view showing a process for feeding high-viscosity material.

As shown in FIG. 2, a screen printing machine 40 is arranged above the mold 10.

The screen printing machine 40 is a machine used for so-called silk screen printing. The screen printing machine 40 has a screen printing plate 42 whose periphery is supported with a frame. The screen printing plate 42 comprises a metal or synthetic resin plate or mesh and is provided with holes for allowing the printing material to pass only at the portions to be printed. Under this embodiment, a round powder passage hole 46 nearly same as the plane profile of the recess portion for molding 16 is provided on the screen printing plate 42 at the portion above the recess portion for molding 16 of the mold 10.

On the top surface of the screen printing plate 42, powder paste 50 of high-viscosity material is fed, and a squeegee 44 in the form of knife with the bottom end pointed moves along the top surface of the screen printing plate 42.

The powder paste 50 is the powder mixing metallic powders to be a bump electrode with a binder comprising synthetic resin which exhibits a function to integrate metal powders at the time of molding.

The powder paste 50 which drops from the powder passage hole 46 as the squeegee 44 moves collects inside each of the recess portions for molding 16. The powder paste 50 can be fed to the amount near the top edge or slightly exceeding the top edge of the recess portion for molding 16.

After the powder paste 50 is fed to the recess portion for molding 16, the heating element 20 heated to high temperatures about 300° C. is brought in contact with the bottom surface of the mold 10 as shown in FIG. 1. Then, heat is transferred from the heating element 20 to the powder paste 50 in the recess portion for molding 16 via the mold 10. The heated powder paste 50 melts and is formed in accordance with the profile of the recess portion for molding 16. If a binder for printing is used for the binder, the binder can be vaporized and allowed to disappear at the time of heating.

Figure 3A:
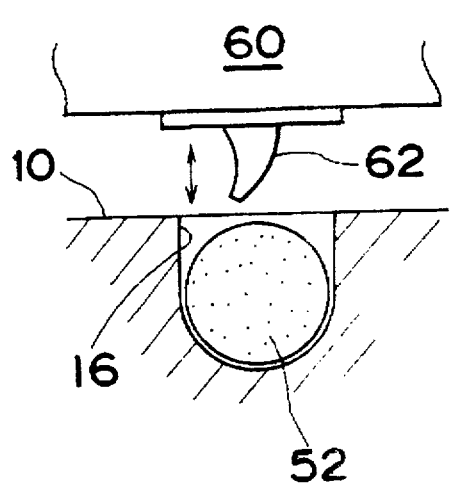
FIG. 3A and FIG. 3B are sectional views showing the molded high-viscosity material traveling process stepwise.

As shown in FIG. 3A, the heated and melted powder 50 is formed in a sphere along the bottom profile of the recess portion for molding 16 by the action such as the surface tension of itself and the molding 52 is formed.

When the powder 50 is heated and melted to produce the molding 52, the heating element 20 is removed from the bottom surface of the mold 10 and the cooling element 30 held to temperatures about 20° C. is brought in contact with the bottom surface of the mold 10. The molding 52 is cooled via the mold 10. When the molding is cooled to the degree that enables easy handling of the molding 52, the cooling element 30 is separated from the mold 10 and cooling is completed. The molding 52 can be removed from the recess portion for molding 16.

Figure 3B:
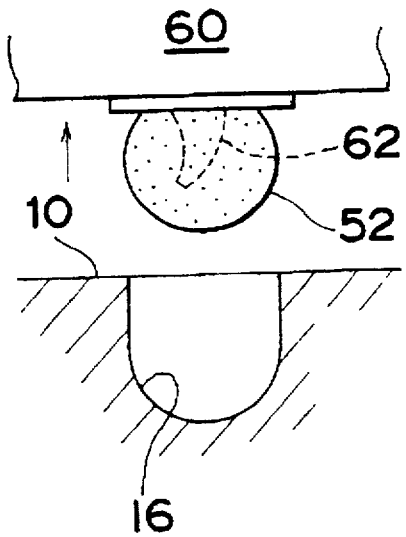

Under this embodiment, as shown in FIG. 3B, the molding 52 is directly moved to the substrate 60 on which the bump electrode is formed. That is, on the bottom surface of the substrate 60, protrusion 62 for supporting the electrode is provided. This protrusion 62 may be a terminal of IC substrate or part of wiring member. The protrusion 62 is brought closer to the mold 10 on the substrate 60 and pierced into the molding 52. In this event, the molding 52 is completely cooled and is in the state easy to deform before solidification. Raising the protrusion 62 pierced into the molding 52 together with the substrate 60 removes the molding 52 from the recess portion for molding 16 with the molding 52 pierced at the top end of the protrusion 62 and moves the molding to the substrate 60. If the molding 52 moved to the substrate 60 further cools and solidifies, the molding 52 is fixed while it is pierced by the protrusion 62.

In this way, if the molding 52 is directly moved from the mold 10 to the substrate 60, it is no longer necessary to carry out operation for removing the molding 52 from the mold 10 and mounting the removed molding 52 to a specified position of the substrate 60 separately, and fabrication of the bump electrode can be carried out remarkably efficiently. Moreover, since no other apparatus or member comes in contact with the molding 52, the profile of the bump electrode fabricated becomes exactly same profile of the molding 52 obtained at the time of molding. The entry of any foreign matter into the molding 52 can also be prevented.

Figure 4A:
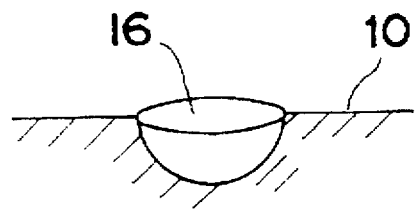
FIG. 4A, FIG. 4B and FIG. 4C are sectional views showing the molding process using another embodiment of the recess portion for molding stepwise.
Figure 4B:
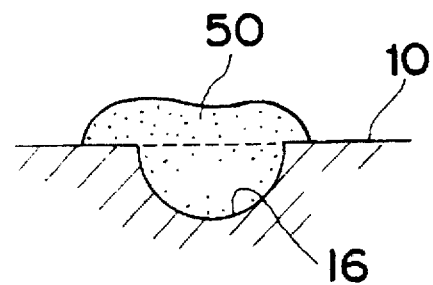

The profile of the recess portion for molding 16 provided to the mold 10 may be semi-circular as shown in FIG. 4A in addition to the columnar profile mentioned above. In the case of the semi-circular recess portion for molding 16, as shown in FIG. 4B, the powder 50 is fed so that the powder rises on the surface of the mold 10 exceeding the top end of the recess portion for molding 16. The powder 50 may be allowed to stick out from the outside of the recess portion for molding 16.

Figure 4C:
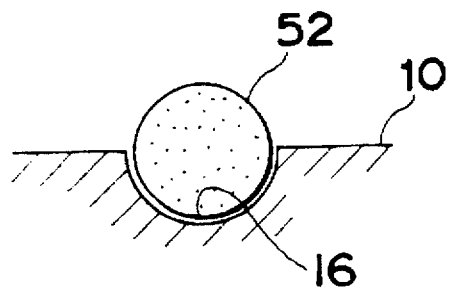

As shown in FIG. 4, when the powder 50 is heated and melted, the molding 52 is formed in the similar manner in the case of above embodiments. Because the powder collects in a spherical shape by the action such as surface tension as the powder 50 is heated and melted and the powder 50 is integrated into the molding 52.

Under this embodiment, because the molding 52 protrudes above the recess portion for molding 16, it is easy to carry out said operation for transferring the molding to the substrate 60. Even if there is no protrusion 62 on the substrate 60, it is possible to transfer the molding 52 to the substrate 60 by bringing the flat surface of the substrate 60 in contact with the top end of the spherical molding 52 protruding from the surface of the mold 10 and affixing the molding 52 to the substrate 60.

Figure 5A:
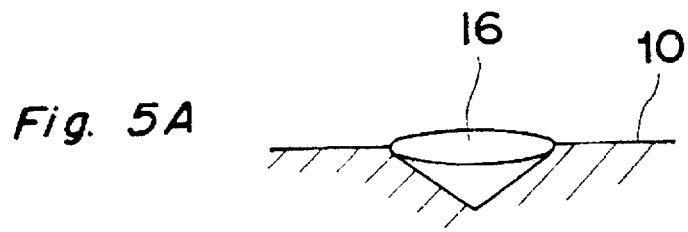
FIG. 5A, FIG. 5B and FIG. 5C are sectional views showing the molding process using still another embodiment of the recess portion for molding stepwise.
Figure 5B:
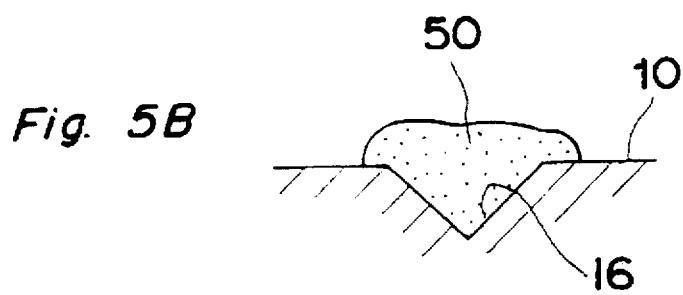
Figure 5C:
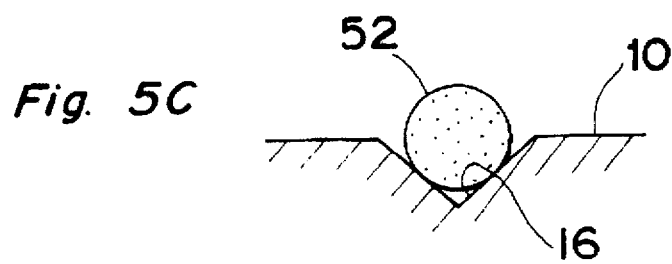

Then, as shown in FIG. 5A–5C, it is possible to use a conical recess portion for molding 16. In this event, the powder 50 fed protruding from the outside of the recess portion for molding 16 is integrated in a spherical form by surface tension and other action when the powder is heated and melted and a spherical molding 52 internally in contact with the conical recess portion for molding 16 is obtained.

Under this embodiment, depending on the amount of the powder 50 fed to the recess portion for molding 16, the sphere diameter of the molding 52 formed varies, it is possible to easily produce the molding 52 in a wide variety of spheres with one type of conical recess portion for molding 16.

As shown in FIG. 6, wire pieces 54 comprising high-viscosity wire bonding material shaped in the thin wire form may be used.

Figure 6A:
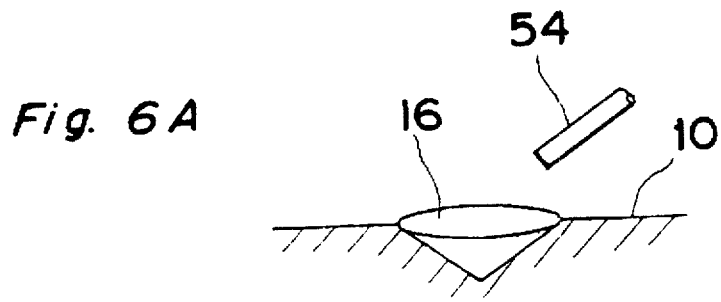
FIG. 6A, FIG. 6B and FIG. 6C are sectional views showing the molding process of the embodiment according to this invention using wire pieces.

As shown in FIG. 6A, the wire piece 54 is arranged above the recess portion for molding 16 of the mold 10. The wire piece 54 is handled by using a handling device of wire pieces similar to the general wire bonding equipment and the like.

Figure 6B:
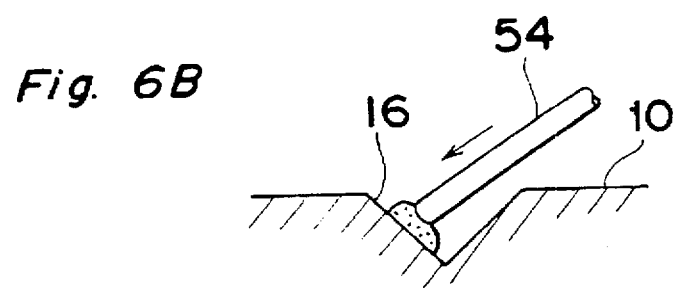

As shown in FIG. 6B, the top end of the wire piece 54 is pressed against the recess portion for molding 16 of the heated mold 10. The wire piece 54 is gradually heated and melted from the top end. Continuously pressing the wire piece 54 against the recess portion for molding 16 heats and melts the wire piece 54 successively and the high-viscosity material in the heated and molten state collects in the recess portion for molding 16.

Figure 6C:
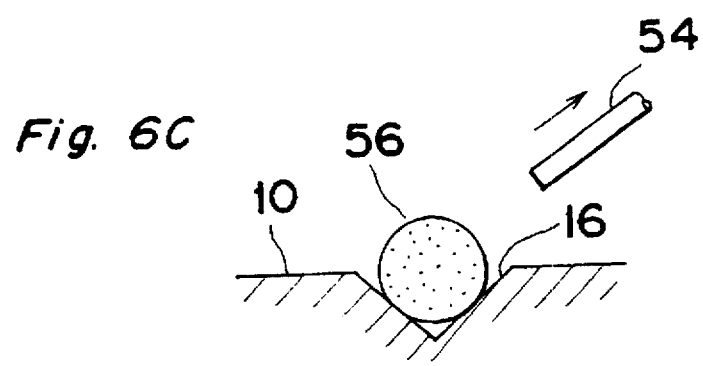

As shown in FIG. 6C, when a required amount of high-viscosity material in the form of wire piece 16 is fed into the recess portion for molding 16, the wire piece 54 is kept away from the recess portion for molding 16. The high-viscosity material in the heated and molten state which collects in the recess portion for molding 16 is spontaneously formed into a spherical form as in the case of above embodiments and the spherical molding 56 is obtained. The subsequent cooling process takes place in the similar manner as in the case of above embodiments.

[Embodiments where vacuum suction is carried out]

Figure 7A:
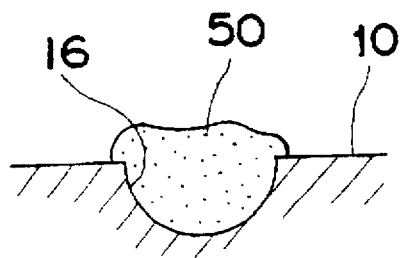
FIG. 7A, FIG. 7B and FIG. 7C are sectional views showing the molding process of the embodiment according to this invention using a vacuum suction device.
Figure 7B:
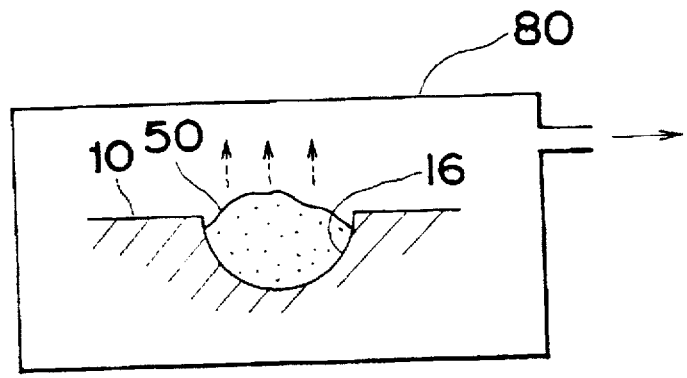

As shown in FIG. 7, the basic process is same as that in the embodiments shown in FIG. 4, but in this embodiment, as shown in FIG. 7A, after the high-viscosity powder 50 is fed into the recess portion for molding 16 of the mold 10, the mold 10 is charged into the vacuum suction equipment 80 as shown in FIG. 7B. In the vacuum suction equipment 80, the mold 10 is heated to discharge volatile constituents such as the binder contained in the powder 50 and at the same time gas inside the vacuum suction equipment 80 is vacuum-sucked and the volatile constituents discharged from the powder 50 are removed outside.

Figure 7C:
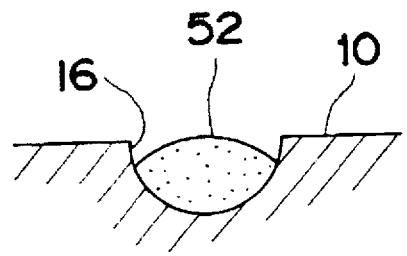

As shown in FIG. 7C, the powder 50 with the volatile constituents removed is heated and melted and formed in accord with the profile of the recess portion for molding 16, and the molding 52 nearly in the form of lens can be obtained.

Under this embodiment, the volatile constituents contained in the high-viscosity material can be quickly and efficiently removed by vacuum sucking and the operability of the molding process can be improved and at the same time, the molding 52 obtained achieves the high quality with less volatile constituent residues.

[Other Embodiments]

(1) The mold 10 may be composed with the laminate 12 with said high-orientation graphite sheets 12a stacked or may be composed using block-form high-orientation graphite.

(2) The recess portion for molding 16 may be machined not only by said electric discharge machining but other machining techniques such as etching and laser machining.

(3) The heat-resistant band 14 may be fabricated with materials other than high-orientation graphite if it provides thermal resistance which can stand heating in the molding process and mechanical strength that can bind the high-orientation graphite sheets 12a. If the heating temperature at the time of molding exceeds 1200° C., ceramic heat-insulating cloth or high-orientation graphite sheet is preferable. When the heating temperature during molding is low, it is possible to use metal bands.

(4) For the high-viscosity material, any optional material can be used if it is said bump electrode material such as various metals, synthetic resins, ceramics, and other materials containing organic or inorganic substances. It is preferable to apply to the material which has hitherto be molded in the high-viscosity liquid state. Specifically, electrode materials, dielectric materials, insulation materials, adhesives, and the like used for various electronic parts are used. It is also possible to use sinter materials for sinter-manufacturing various mechanical parts. Optical parts materials such as glass can also be used. To use the high-viscosity material in the form of powder or wire pieces, the material which can be processed in each form should be used.

(5) To heat and melt the high-viscosity material for molding, the material is heated to the heating temperature that is suited for relevant high-viscosity materials. If the heating temperature is comparatively low, the high-viscosity material can be molded in the atmosphere but when the heating temperature exceeds as high as 800° C., it is preferable for molding in inert gas.

(6) To produce the molding 52 from high-viscosity material powders 50 or wire pieces 54, a means for heating the mold 10 is essential but when it is cooled only by air cooling, a special cooling means is not always required. However, to improve the operability by quickly cooling the molding, the cooling means such as the cooling element 30 described above is effective.

(7) This invention is not only applied to molding of said bump electrode and spot-form adhesives but also to molding of sinter material for sinter-manufacturing various mechanical parts. It can also be applied to melt-forming of optical parts such as glass.

Figure 10:
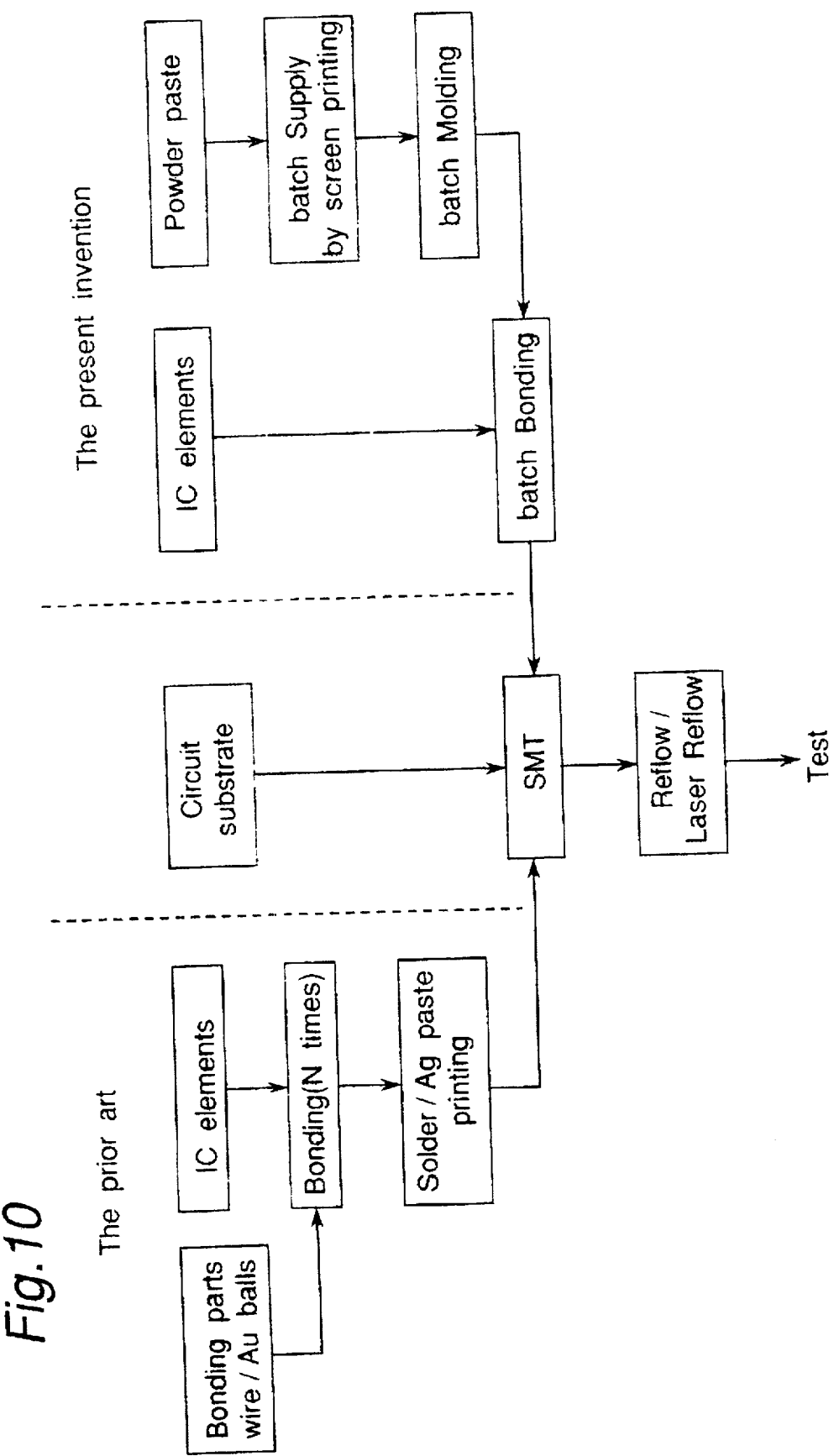
FIG. 10 is a process chart comparing the processes for mounting to circuits when the conventional mounting process and the process according to this invention are applied.

FIG. 10 compares the conventional process with the case where the process according to this invention is applied in mounting. That is, in the conventional process, bonding parts are formed by bonding wire and gold ball and bonded to the ICs conveyed. If there are N pieces of bonding places, bonding is repeated N times. Then, soldering/silver paste is printed and the relevant IC parts are surface-mounted on the circuit substrate separately conveyed. Then, after the reflow/laser reflow is provided to the circuit substrate with IC parts mounted, final inspection is carried out on the mounting.

According to this invention, the printing paste formed by mixing the powder for high-viscosity material for bonding parts with the printing binder is fed to the recess portion of the mold according to this invention by screen printing, and is heated and melted and then cooled for molding. By one molding, stereoscopic bonding parts are manufactured and arranged in a line inside the mold. Consequently, it is possible to convey specified ICs to the mold equipped with this aligned bonding parts and allow the bonding parts to be transferred in a batch and bonded. Circuit substrates is surface-mounted in the similar manner to that carried out in the conventional manner.

Figure 11:
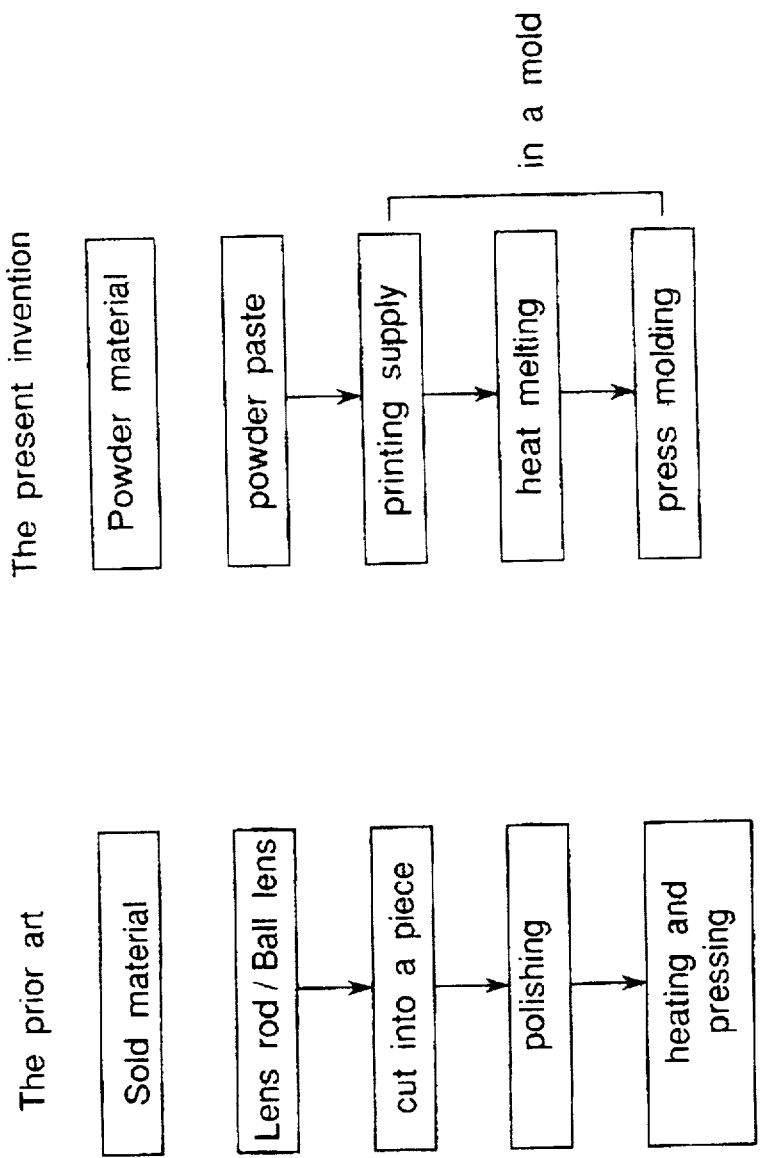
FIG. 11 is a process chart comparing the molding process when the conventional molding process of optical parts and the process according to this invention are applied.

FIG. 11 compares the molding methods in molding optical parts when the conventional method and the method according to this invention are applied. That is, conventionally, for the lens material, ball lens is cut from a lens rod, and is ground into a specified profile, made into a specified profile by a hot press, and is further ground for final inspection.

As against this, when this invention is applied, lens material glass frits are pulverized to super fine powders and mixed with acrylic low molecular weight compound (for example, green sheet binder for ceramics) as a printing binder to produce a paste. This paste is injected into the recess portion for molding of the mold by the printing method according to this invention. Then, with the heat cycle meticulously controlled by the laser beam, the paste is heated to high temperatures of about 16000°C. and melted to allow the binder component to vaporize, and is subjected to press molding. According to the process of this invention, the process for cutting and grinding the lens ball is not required, achieving a remarkably easy molding process.

What is claimed is:

1. A method of molding a high-viscosity material having a high melt viscosity, which comprises the steps of:

preparing a mold fabricated with a high-orientation graphite material;

feeding the high-viscosity material into a molding recess portion of said mold in a non-molten state;

heating the high-viscosity material in said recess portion of said mold from outside said mold to melt said high-viscosity material; and cooling the molten high-viscosity material in said recess portion of said mold from outside said mold to mold said molten high-viscosity material into a desired shape, wherein the high-orientation graphite material is a high-orientation graphite block, a high-orientation graphite sheet or a laminate of stacked high-orientation graphite sheets.

2. The method of molding a high-viscosity material according to claim 1, wherein the high-orientation graphite material for said mold is a laminate body composed of high-orientation graphite sheets stacked to have graphite crystals oriented from one end to the other end along an extended face thereof, on one end face of the laminate said recess portion being arranged in order to transfer heat to said molding recess portion from outside said mold.

3. The method for molding a high-viscosity material according to claim 2, wherein the graphite material for said mold comprises a first laminate body composed of high-orientation graphite sheets stacked to have graphite crystals oriented from one end to the other end along an extended face thereof and a second laminate body with the high-orientation graphite sheets stacked to have graphite crystals oriented from one end to the other end along an extended face there, said first and second laminate bodies being constructed in such a manner that the orientations intersect orthogonally with each other, thereby said recess portion arranged on the end face of the first laminate body can be heated and cooled from said second laminate body via said first laminate body.

4. The method of molding a high-viscosity material according to claim 3, wherein said laminate bodies are integrally fixed by bundling them with heat-resistant band.

5. The method of molding a high-viscosity material according to claim 1, wherein said mold further comprises a means for feeding the high-viscosity material to said recess portion and a means for selectively heating and cooling the high-viscosity material existing in said recess portion via said mold from outside in order to melt the high-viscosity material and solidify the molten high-viscosity material.

6. The method of molding a high-viscosity material according to claim 5, wherein the high-viscosity material is fed as a powder or a paste with a printing binder and said means for feeding the high-viscosity material comprises a screen printing machine comprising a screen printing plate with a powder passage located at a position corresponding to said recess portion arranged at the upper part of said mold and a squeegee for pushing the high-viscosity material fed to the top surface of the screen printing plate along the screen printing plate.

7. The method of molding a high-viscosity material according to claim 6, wherein the high-viscosity material is selected from the group consisting of metal powders, bump material powders, dielectric material powders, insulating material powders and optical element material powders.

8. The method of molding a high-viscosity material according to claim 5, wherein said high-viscosity material is a wire and said means for feeding high-viscosity material comprises a wire feeding machine located at the upper part of the surface with the recess portion of said mold for feeding the tip of the wire to the recess portion.

9. The method of molding a high-viscosity material according to claim 8, wherein said high-viscosity material is a wire for wire bonding.

10. The method of molding a high-viscosity material according to claim 5, wherein the heating and cooling means comprises a heating body and a cooling body selectively contactable with the opposite surfaces of said mold.

* * * * *